(12) United States Patent
Takaki

(10) Patent No.: US 8,307,302 B2
(45) Date of Patent: Nov. 6, 2012

(54) REMOTE CONTROL HANDSET

(75) Inventor: Goro Takaki, Tokyo (JP)

(73) Assignee: Sony United Kingdom Limited, Weybridge (GB)

( * ) Notice: Subject to any disclaimer, the term of this patent is extended or adjusted under 35 U.S.C. 154(b) by 758 days.

(21) Appl. No.: 12/466,133

(22) Filed: May 14, 2009

(65) Prior Publication Data

US 2009/0284468 A1    Nov. 19, 2009

(51) Int. Cl.
*G06F 13/00* (2006.01)
*G06F 15/00* (2006.01)

(52) U.S. Cl. .......................................... 715/810; 725/76

(58) Field of Classification Search .................. 715/810, 715/738, 851, 853; 725/76, 52; 345/173
See application file for complete search history.

(56) References Cited

U.S. PATENT DOCUMENTS

| | | | |
|---|---|---|---|
| 5,973,757 A | 10/1999 | Aubuchon et al. | |
| 2006/0247851 A1* | 11/2006 | Morris | 701/209 |
| 2009/0079705 A1* | 3/2009 | Sizelove et al. | 345/173 |

FOREIGN PATENT DOCUMENTS

| | | |
|---|---|---|
| GB | 2 367 202 A | 3/2002 |
| WO | WO 97/36257 | 10/1997 |

OTHER PUBLICATIONS

U.S. Appl. No. 12/265,346, filed Nov. 5, 2008, Liu, et al.

* cited by examiner

*Primary Examiner* — Cao "Kevin" Nguyen

(74) *Attorney, Agent, or Firm* — Oblon, Spivak, McClelland, Maier & Neustadt, L.L.P.

(57) ABSTRACT

A remote control handset 10 is provided for navigating a user interface of an entertainment device, the user interface having a hierarchical menu structure. The remote control handset 10 has a button 40 on its upper surface 20, and a button 120 on its lower surface 80. The button 40 on its upper surface 20 is used to navigate deeper into the hierarchical menu structure, and the button 120 on its lower surface 80 is used to navigate in the other direction (i.e. higher) in the menu structure. The remote control handset 10 is thus configured to make navigation of a graphical interface having hierarchical menu structure more intuitive, logical, and efficient.

21 Claims, 7 Drawing Sheets

REMOTE CONTROL HANDSET

BACKGROUND OF THE INVENTION

1. Field of the Invention

The present invention relates to a new remote control handset, in particular to a remote control handset for navigating a user interface of an entertainment device. The present invention also relates to a method of navigating a user interface, in particular, a method of navigating a user interface for an entertainment device using a remote control handset.

2. Description of the Related Art

Remote control devices are currently used to control various functions of an entertainment device, such as a television. As entertainment devices become more complex (for example by having a large number of television, radio and/or IPTV channels available, and being able to output a variety of formats, such as photographs, music, video and the internet), it has become increasingly common to use a remote control handset for navigating a user interface. In this way, the remote control handset can be used to control various functions of and options available to the entertainment device.

The present invention recognises that in presently available remote control handsets, the various control surfaces and buttons which are provided do not intuitively correspond to the interface with which the remote control handset is interacting. That is to say, there is currently no logical link between the structure of the remote control handset and the user interface which is being used to control. Thus, the user of such a remote control handset is required to move their attention between the remote control handset and the user interface in order to navigate the user interface using the remote control handset.

OBJECTS AND SUMMARY OF THE INVENTION

According to the present invention there is provided a method for navigating a user interface of an entertainment device using a remote control handset, the user interface having a hierarchical menu structure, the method including:

providing a remote control handset having: a body with an upper surface and a lower surface, the lower surface being substantially opposite to the upper surface; a first actuation element; and a second actuation element;

arranging the first actuation element on the upper surface of said body;

arranging the second actuation element on the lower surface of said body;

navigating through the hierarchical menu structure in a first direction using said first actuation element; and navigating through the hierarchical menu structure in a second direction that is opposite to said first direction using said second actuation element.

According to the present invention there is also provided a remote control handset for navigating a user interface of an entertainment device, the user interface having a hierarchical menu structure with at least two levels, the remote control handset including:

a body having an upper surface and a lower surface, the lower surface being substantially opposite to the upper surface;

a first actuation element provided on the upper surface of said body; and a second actuation element provided on the lower surface of said body, wherein:

said first actuation element is configured to provide a signal for navigation through levels of the hierarchical menu structure in a first direction; and said second actuation element is configured to provide a signal for navigation through levels of the hierarchical menu structure in a second direction that is opposite to said first direction.

Providing such a remote control handset, and such a method of navigating a user interface using a remote control handset, enables a user of an entertainment device to navigate the user interface of that entertainment device in a more intuitive and logical manner than is the case with a conventional remote control handset. In particular, a user operating a remote control handset to navigate a user interface device with a hierarchical menu structure would be able to navigate through the levels of the hierarchical menu structure more efficiently and quickly. This results from providing a remote control handset with a first actuation element provided on an upper surface for navigation through the levels in one direction, and a second actuation element provided on a lower surface for navigation through the levels in the other direction.

The first actuation element and the second actuation element can be any suitable type of actuation elements. However, preferably, the remote control handset is provided with both the first actuation element and the second actuation element being push buttons. More preferably still, the push bottom forming the first actuation element is configured to be depressed in a direction that defines the positive direction of a first axis and the push button representing the second actuation element is configured to be depressed in a direction that has a component in the negative direction along the first axis.

According to this embodiment, push buttons are provided on the remote control handset to navigate between the layers of a user interface with a hierarchical menu structure. One of the push buttons is depressed in one direction to navigate one of either upwards or downwards through the levels of the hierarchical menu structure, and another push button is depressed in a different, preferably substantially opposite, direction to navigate through the levels of the menu structure in an opposite manner.

As such, the user of such a remote control handset would find navigation between the levels of the hierarchical menu structure even more intuitive. For example, the user could use one digit (such as thumb) to operate the push button on the upper surface of the remote control handset, and another digit (for example index finger) to operate the push button on the lower surface of the remote control handset.

Preferably, the remote control handset with push buttons as outlined above further has the second actuation element (e.g. push button) configured to be depressed in a direction that has a component in a second axis that is orthogonal to the first axis, and has no component in a third axis that is orthogonal to the first axis and the second axis, with the second axis pointing substantially along a longitudinal direction of the body of the remote control handset.

One push button can thus be arranged on the upper surface of the remote control handset and depressed in a direction substantially normal to the upper surface. The other push button can be arranged on the lower surface of the body and depressed a direction that is substantially normal to the lower surface of the body. As such, the push buttons are depressed in a direction that is substantially opposite to each other (or at least in a direction that contains a component opposite to each other) and are thus easily operated by opposing digits of a users hand.

In some arrangements, the actuation elements need not be push buttons. For example, according to one arrangement, the remote control handset has one or more of the first actuation element and second actuation element being a touch-sensitive input device, such as a touchpad. According to this arrangement, there is no need to have depressable push buttons on the remote control handset. This reduces the number of moving parts on the remote control handset. Furthermore, it may improve the aesthetics of the remote control handset and/or make it easier for a user to operate.

In one arrangement, regardless of whether the first and second actuation elements are touch-sensitive devices or push buttons, or some other actuation elements, the first actuation element is provided on a first surface having a normal that defines the positive direction of the first axis and the second actuation element is provided on a second surface having a normal that has a component in the negative direction of the first axis.

Again, according to this arrangement, use of the actuation elements to move between levels of a hierarchical menu structure is particularly intuitive. For example, the first actuation element could be operated by a user's thumb to move in one direction through the hierarchical menu structure, and the second actuation element could be operated by a user's index finger to move in the other direction through the hierarchical menu structure.

The normal of the second surface on which the second actuation element may be provided may have a component in a second axis that is orthogonal to the first axis, and no component in a third axis that is orthogonal to the first axis and the second axis, and the second axis may point substantially along a longitudinal direction of the body of the remote control handset.

According to this arrangement, the second actuation element can be provided on a surface that points substantially opposite to (or at least has a substantial component that is opposite to) the first surface. This makes navigation through the hierarchical menu structure particularly intuitive and straightforward for a user of the remote control handset, for example using digits on one of their hands.

In the arrangements described above which refer to a third axis, the third axis preferably points substantially along a width direction of the body of the remote control handset. The dimension of the remote control handset in the longitudinal direction is typically greater than the dimension of a remote control handset in the width direction.

According to this arrangement, the dimensions of the remote control handset can be made such that it easily sits in the hand, for example the palm of the hand, of a user. This means that both the first and the second actuation elements of the remote control handset can be operated using a single hand.

In some arrangements, the remote control handset can further include a touch-sensitive input device, such as a touchpad, configured to interact with the entertainment device. The first actuation element can be a part of the touchpad.

According to this aspect of the invention, the first actuation element can be combined with a touchpad for controlling other functions of the entertainment device and/or user interface. This can further improve the ease of use of the remote control handset.

The touchpad may be configured to provide signals for control of any suitable function of the entertainment device and/or navigation of the user interface. However, preferably, the touchpad is configured to provide a signal for navigation within the levels of the hierarchical menu structure of the user interface.

According to this arrangement, the first and second actuation elements can be used to navigate intuitively between the levels of the hierarchical menu structure, and the touchpad can be used to navigate within the levels of the user interface. This means that navigation throughout the whole of the hierarchical menu structure of the user interface can be simple and intuitive.

According to another arrangement, the touchpad may be additionally or alternatively configured to provide a signal for controlling parameters of the entertainment device, these parameters including at least one of: sound parameters; picture colour parameters; and channel number.

According to this aspect of the invention, the touchpad may be used to control various parameters of the entertainment device itself, as well as or instead of being used to navigate within the levels of the hierarchical menu structure. As such, the touchpad and actuation elements can be used to control intuitively the entertainment device, as well as the hierarchical menu structure of the user interface for the entertainment device.

The function of the touchpad may also change in response to the state of the entertainment device.

This means that, depending on, for example, whether the user interface is in a particular level of the hierarchical menu structure, or whether the user interface is not currently in use in the entertainment device, the function of the touchpad can change accordingly. Thus, for example, if the entertainment device were showing a television channel, then the touchpad could be used to control sound or picture parameters, or channel number. Similarly, if the hierarchical menu structure were in a particular level, then a touchpad could be used to navigate within that level. As such, control of the entertainment device, and the user interface therefor, can be simplified.

According to one arrangement, the touchpad is provided with a display associated with its function at any given time, and the display on the touchpad can change in response to a change in function of the touchpad.

As such, the display on the touchpad can be altered according to the function that can be performed by the touchpad at any given time. This makes use of the touchpad to control the entertainment device and/or the user interface for the entertainment device more intuitive.

According to one arrangement, the change in function of the touchpad and/or change in display provided on the touchpad can be enabled by configuring the remote control handset to interact with the entertainment device so as to identify the state of the entertainment device. This interaction can be through any suitable means, such as using Bluetooth™ technology or any other wireless bi-directional technology.

According to a preferred aspect of the invention, the second actuation element is configured such that it can only be operated when the hierarchical menu structure of the user interface is in a level in which operation of the second actuation element would cause a change in the level.

According to this aspect, a user would not be able to operate the second actuation element unless its operation would have an effect on the level of the hierarchical menu structure. For example, if the second actuation element were used to navigate upwards through the hierarchical menu structure, but the hierarchical menu structure were already at the top level, then operation of the second actuation element would not be allowed. This feature could further enhance the user's use of the remote control handset and make the interaction between the remote control handset and the hierarchical menu structure still more intuitive.

According to another aspect of the invention, one or more of: the first actuation element; the second actuation element;

and the touchpad may be configured to provide a tactile output in response to one or more of: the state of the entertainment device; the state of the user interface; and an input on the remote control handset.

This arrangement would enable a user to sense the interaction between the remote control handset and the entertainment device directly through the remote control handset, without necessarily having to view the entertainment device. This would further improve the ease of use of the remote control handset. This could be particularly beneficial for visually impaired users.

According to one arrangement, the remote control handset may further comprise another actuation element configured to allow selection of content in the user interface.

According to this aspect, once the user of the remote control handset had navigated through the menu structure to the particular piece of content that they wanted to select, they could then select that content, for example for viewing, by operating this extra actuation element.

Preferably, the remote control handset is configured such that:

the first direction, in which the first actuation element is configured to provide signals for navigation through the hierarchical menu structure, moves deeper into (or downwards through) the hierarchical menu structure; and the second direction, in which the second actuation element is configured to provide signals for navigation through the hierarchical menu structure, moves upwards in (or higher up through) the hierarchical menu structure.

Of course, the remote control handset could be configured with the directions through which the hierarchical menu structure that the respective actuation elements are configured to provide signals to move in reversed. However, it is thought that the configuration described above would be most intuitive to the users of the remote control handset.

The remote control handset may be configured to control any suitable form of entertainment device. However, preferably, the remote control handset is configured to control a television via a graphical user interface.

According to the present invention there is also provided a control apparatus for an entertainment device including:

a remote control handset as described herein; and a user interface for an entertainment device, the user interface having a hierarchical menu structure with at least two levels, wherein the remote control handset is configured to provide signals for navigating the user interface.

According to this arrangement, the remote control handset is configured to provide signals for navigating the user interface. These signals could be used to provide instructions for a controller that controls the hierarchical menu structure, for example, a controller that controls navigation through the hierarchical menu structure. Such a controller could be provided in the remote control handset itself, but it is preferably provided in the entertainment device. The controller may, in turn, be used to provide instructions for, or inputs to, software used for the user interface.

Accordingly, the present invention provides both the user interface for an entertainment device, and the remote control handset configured to navigate that user interface. Thus, the user of an entertainment device is provided both with the logical, efficient and intuitive remote control, handset, together with the user interface that can be controlled logically, efficiently and intuitively using the remote control handset.

Also according to the present invention, there is provided an entertainment system including:

the remote control handset and user interface defined above; and an entertainment device, wherein the control apparatus configured to provide signals for controlling the entertainment device. As such, according to the present invention, there can be provided a remote control handset configured to navigate a user interface for an entertainment device, the user interface itself, and the entertainment device.

DETAILED DESCRIPTION OF THE PREFERRED EMBODIMENTS

The invention will be more clearly understood from the following description, given by way of example only, with reference to the accompanying drawings.

Remote control handsets are commonly used for operating entertainment devices. Usually, the entertainment device is controlled using the remote control handset via a user interface. Often, the user interface has a hierarchical menu structure. This helps to arrange the content and options available to the user in a logical and intuitive manner.

The remote control handset 10 according to an embodiment of the present invention illustrated in FIGS. 1-4 is configured to allow intuitive and efficient navigation through such a hierarchical menu structure.

Figure 1:
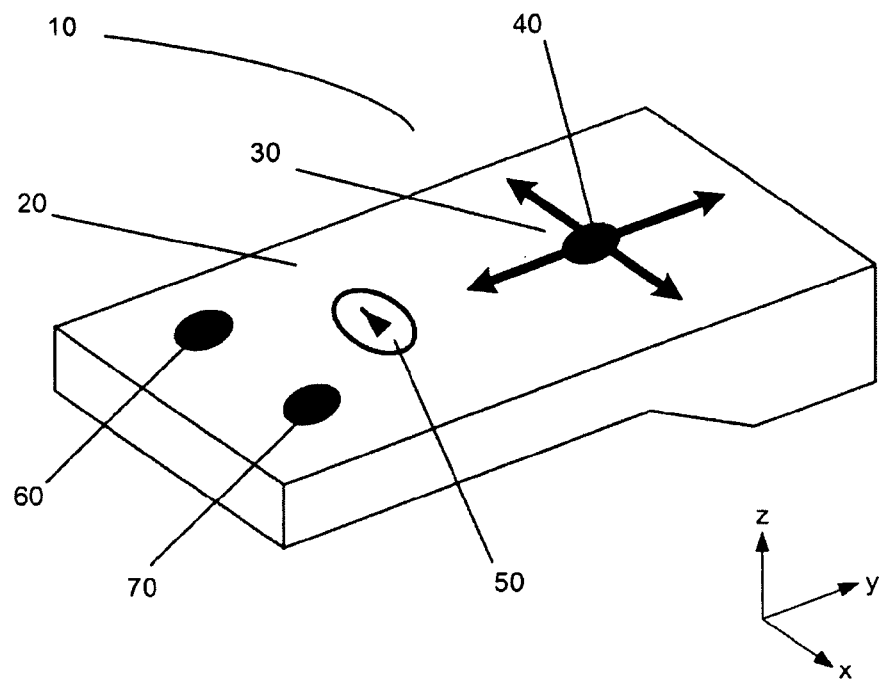
FIG. 1 illustrates a perspective view of an embodiment of a remote control handset according to the present invention that shows side and top surfaces of the remote control handset.
Figure 2:
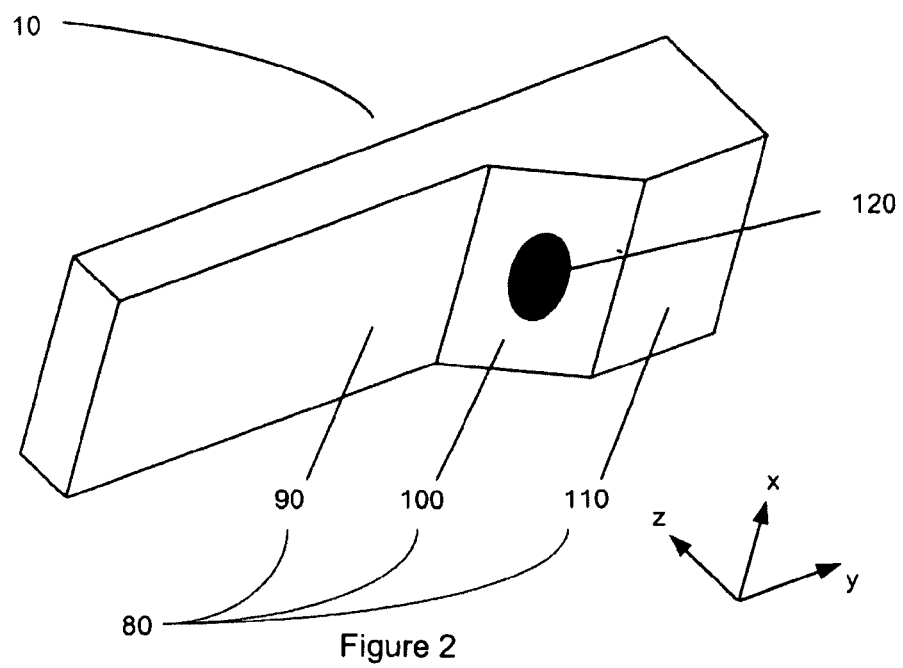
FIG. 2 illustrates another perspective view of the remote control handset of FIG. 1, this time showing side and lower surfaces of the remote control handset.

The remote control handset 10 shown in FIGS. 1 and 2 has an upper surface 20 with a first actuation element 40 provided thereon, and a lower surface 80 with a second actuation element 120 provided thereon. According to the examples shown in FIGS. 1 and 2, the first and second actuation elements 40, 120 are push buttons operable by being depressed substantially towards the surface on which they are located. In alternative embodiments, any other form of actuation element could be provided, such as a touchpad.

The first push button 40 (located on the upper surface 20 of the remote control handset 10) is used to navigate through a hierarchical menu structure of a user interface for an entertainment device in a downwards direction i.e. it is used to navigate from one level to a lower level. The second push button 120 located on the lower surface 80 of the remote control handset 10 is configured to allow navigation in the other direction through the hierarchical menu structure i.e. in an upwards direction through the hierarchical menu structure such that it can be used to move from one level to a higher level in the hierarchical menu structure. Further details of the operation of push buttons 40 and 120, and how they interact with a typical menu structure, are set out below in relation to FIGS. 5-12.

In alternative embodiments, the direction through the hierarchical menu structure in which each push button 40, 120 is configured to cause movement could be reversed. In other words, operation of first push button 40 could be configured to provide movement from one level in the menu structure to a higher level in the menu structure, and operation of second push button 120 could be configured to provide movement from one level in the menu structure to a lower level.

In the remote control handset 10 shown in FIGS. 1 and 2, the lower surface 80 comprises three separate surfaces 90, 100, 110 joined together. Two of the surfaces 90, 110 are substantially parallel to the upper surface 20 of the remote control handset 10, and are joined together by an angled surface 100. Such a configuration improves the ease of use of the remote control handset 10, for example by enable a user to easily hold the remote control handset 10 in one hand.

Also in the remote control handset 10 of FIGS. 1 and 2, the second push button 120 is provided on the angled portion 100 of the lower surface 80. However, it will be understood that the arrangement of lower surface 80 shown in FIGS. 1 and 2 is not essential, and that the second push button (or actuation element) 120 could be provided anywhere on the lower surface 80.

FIGS. 1-4 also include an illustration of an axis system that can be used to aid the description of the remote control handset 10 and its operation. According to the system shown in FIGS. 1-4, the upper surface 20 of remote control handset 10 is substantially planar and lies in a plane containing the x- and y-axes. The y axis may be referred to herein as a longitudinal axis of the remote control handset. The illustrated example of remote control handset 10 has a longer dimension in the y-axis than it has in the x- or z-axes. The x axis may be referred to herein as a width direction of the remote control handset 10. The z axis may be referred to herein as a height direction of the remote control handset 10.

In the remote control handset 10 shown in FIGS. 1-4, the first push button 40 is configured to be depressed along the z-axis. In some handsets, it may be configured to be depressed along an axis that has a greater component in the z-axis direction than either of the y-axis or x-axis directions. The second push button 120, on lower surface 80, is configured to be depressed along an axis that contains a component in the z-axis that is in the opposite direction to the component in the z-axis of the axis along which the first push button 40 is configured to be depressed. As such, first push button 40 and second push button 120 are configured to be depressed in substantially opposite directions.

The upper surface 20 of remote control handset 10 shown in FIGS. 1-4 also comprises a touch-sensitive input device 30, which could be for example, a touchpad 30. The touchpad 30 could be configured to be responsive to motion across it, for example from a user's finger. Touchpad 30 is configured to provide signals to control and entertainment device, and/or to navigate a user interface for an entertainment device. As will be described below in relation to FIGS. 5-12, the touchpad 30 can be used to navigate within levels of a user interface having a hierarchical menu structure.

The touchpad 30 may be configured such that a user's finger is required to be in contact with it for longer than a preset time in order to activate the touchpad 30 to receive an input. As such, the touchpad 30 could be configured such that if a finger is only in contact with it for a short period of time, then the motion on the touchpad 30 is ignored, and no input is made. This can help to prevent inadvertent actuation.

The touchpad 30 may also be configured to be sensitive to the velocity of motion across it. For example, referring to FIGS. 6-11 (described in detail below), a rapid motion across the surface of the touchpad 30 may cause a cursor to move from the left column to the right column, whereas a slow motion across the surface of the touchpad may cause the cursor to move step by step between the highlightable cells.

Figure 3:
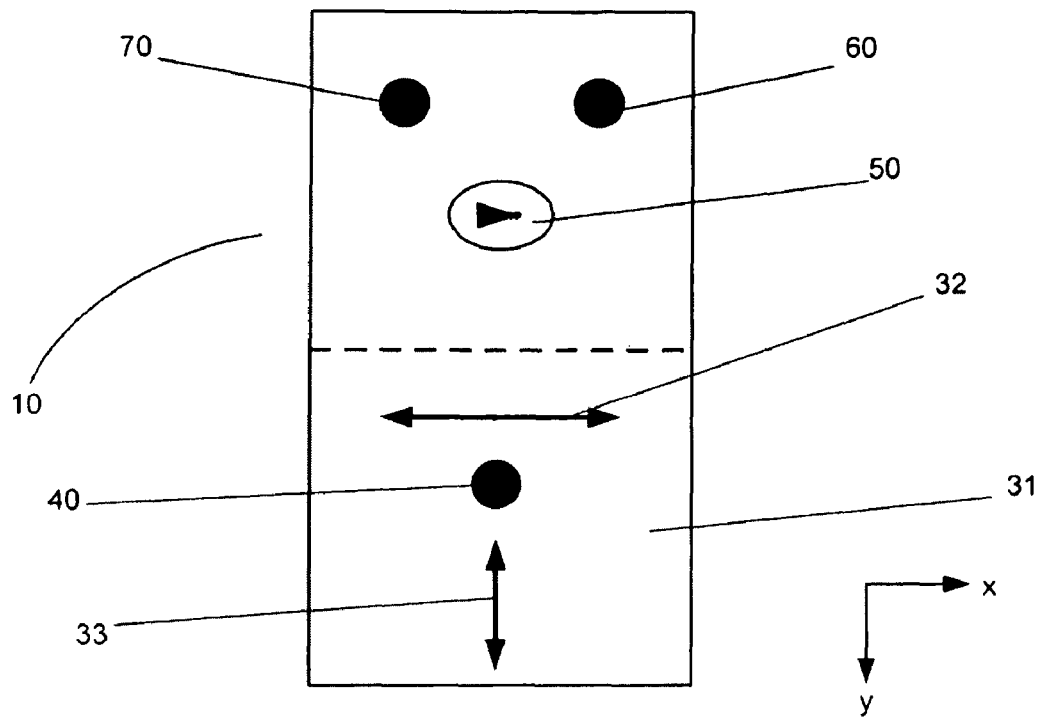
FIG. 3 illustrates a front view of the remote control handset of FIG. 1 with one configuration of touchpad.
Figure 4:
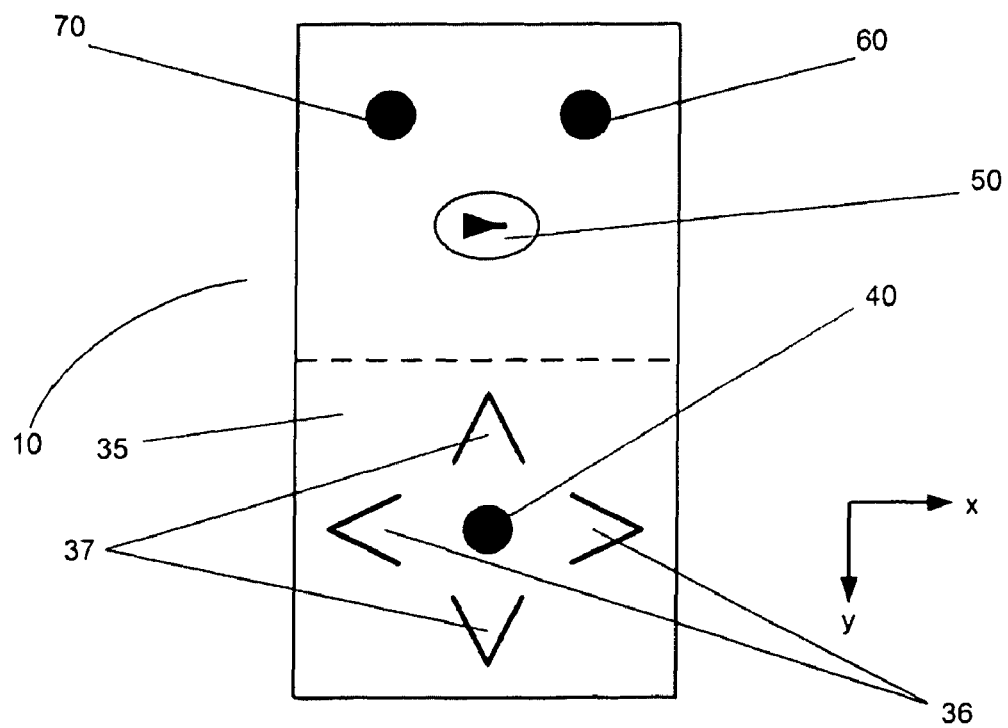
FIG. 4 illustrates another front view of the remote control handset of FIG. 1, showing a different configuration of touchpad to that shown in FIG. 3.

As shown in FIGS. 3 and 4, the touchpad 30 can have a display shown on it. Furthermore, this display can change in response to change in function of the touchpad. Thus, the touchpad 30 can take the form of touchpad 31 shown in FIG. 3 or, for example, touchpad 35 shown in FIG. 4. The display 31, 35 of touchpad 30 can be provided by a graphical output device, such as a liquid crystal display (LCD).

In order to change the appearance of the display 31, 35 in response to the function that it is performing, the remote control handset can be configured to interact with an entertainment device that it is controlling so as to identify the state of the entertainment device. Such interaction could make use of, for example, Bluetooth™ technology.

For example, if the entertainment device is in a state where it is simply outputting content (for example a television program is being shown on the entertainment device) then the display 31 of FIG. 3 could be shown on touchpad 30, and its input options adjusted accordingly. Display 31 comprises arrows 32 and 33. Motion that is substantially along the x direction in the region of arrow 32 of display 31 could, for example, cause the volume (or other output parameter of the entertainment device, such as colour settings or other sound settings) to be changed. Motion that is substantially in the y direction in the region 33 of display 31 could, for example, enable a user of the remote control handset to scroll through the channels, or other content, being displayed by the entertainment device.

The touchpad may be a touch sensitive LCD panel. The input options may change and be displayed to the user on the LCD and be assigned to different touch sensitive portions of the LCD accordingly.

In an alternative display 35 of touchpad 30 shown in FIG. 4, the display has two sets of orthogonal arrows 36, 37. This display could be shown on the handset 10 when, for example, the remote control handset 10 detects that a certain level in a hierarchical menu structure of a user interface is being displayed on the entertainment device. Motion across in the direction of the arrows 36, 37 and in the region of those arrows 36, 37, could enable a user of the remote control handset 10 to scroll through various options within the level of the menu structure being displayed in directions corresponding to those of the arrows. For example, the remote control handset 10 could be configured such that motion in the direction of the arrows 36, 37 could result in scrolling through the options in the menu structure in directions corresponding to those of the arrows when the remote control handset 10 is held by a user in the conventional manner i.e. with the touchpad 30 facing upwards and the front of the handset 10 pointing generally towards the entertainment device that it is being used to control.

Thus, not only can the display 31, 35 of the touchpad 30 change in response to a change in the state of the entertainment device that it is being used to control, but the allowable inputs on touchpad 30 can also change. For example, whereas the region 32 directly above the first push button 40 according to display 31 in FIG. 3 is responsive to motion substantially in the x direction, the region 37 of the upper arrow above the first push button 40 shown in the display 35 of FIG. 4 (which region is physically located in a similar area to arrow 32 of display 31 shown in FIG. 3) is responsive to motion generally in the negative y direction.

As shown in FIGS. 1, 3 and 4, the first push button (or actuation element) 40 can be provided as part of touchpad 30. As such, the touchpad 30 may be physically depressed in region 40 so as to operate the push button 40.

In alternative embodiments, push button 40 may instead be a different actuation element, such as a separate (or integrated) touchpad. In such other embodiments, the touchpad 30 may not physically be depressed, but could instead be responsive to being touched in that region.

The remote control handset 10 shown in FIGS. 1-4 also comprises further actuation elements 50, 60 and 70. Each actuation element 50, 60, 70 can be any suitable actuation element, such as a push button, or a touch-sensitive input device.

According to the illustrated example, actuation element 50 could be a selection, or play button. This could be used, for example, to select content from a user interface for being displayed on the entertainment device. Extra actuation elements 60, 70 could be configured to operate any suitable function, such as being power, and/or mute buttons.

As stated above, the remote control handset 10 is configured to control an entertainment device. In particular, the remote control handset 10 is configured to provide signals to operate, or control, a user interface of an entertainment device, the user interface having a hierarchical menu structure. Such a user interface having a hierarchical menu structure, and the navigation thereof using remote control handset 10, will now be described, by way of example only, with reference to FIGS. 5-12.

Figure 5:
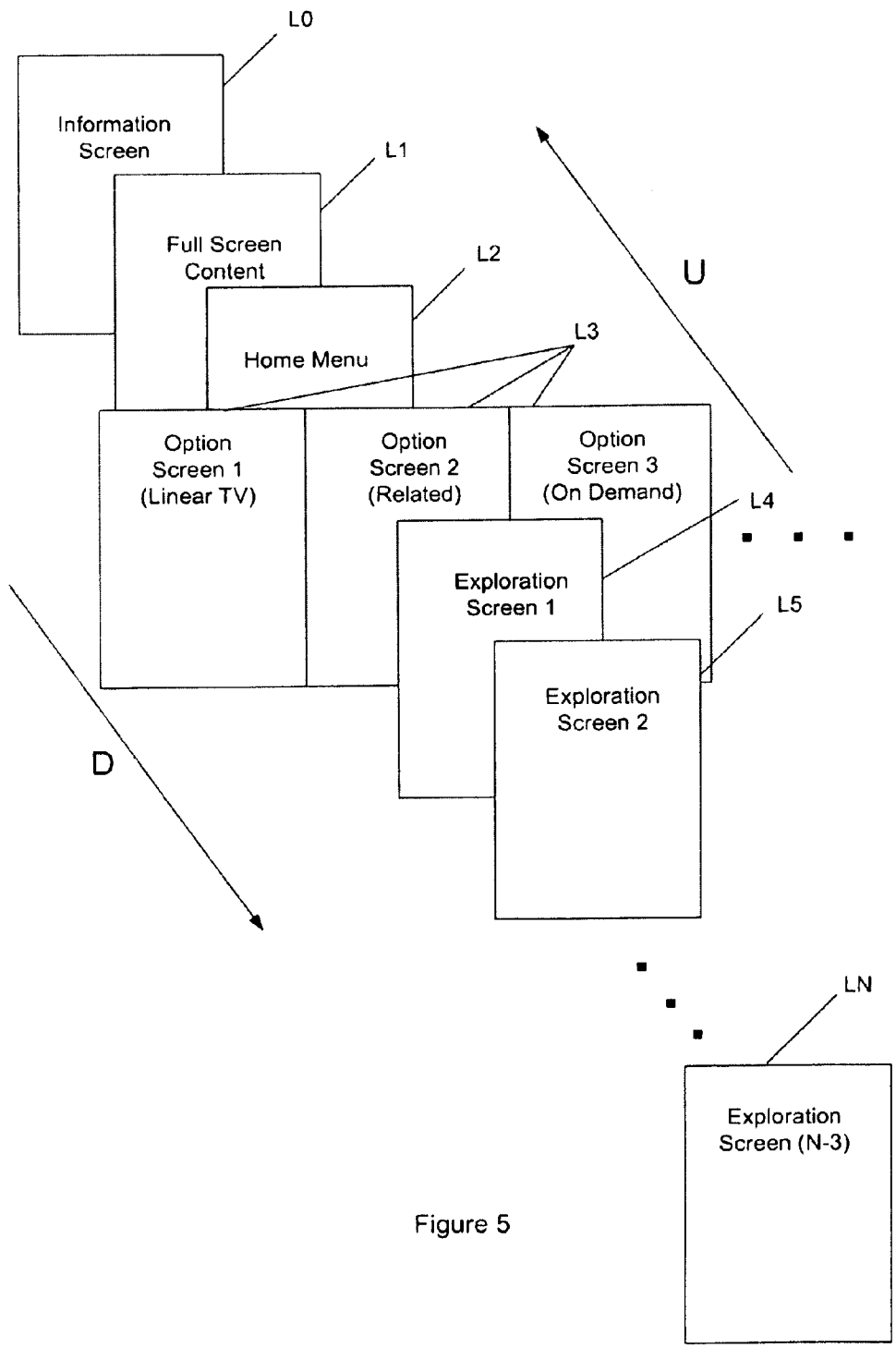
FIG. 5 illustrates a schematic view of a hierarchical menu structure that could form the basis of a graphical user interface to be navigated by a remote control handset according to the present invention.

A schematic of an example user interface having a hierarchical menu structure that could be controlled using remote control handset 10 is shown in FIG. 5. As shown in FIG. 5, the illustrated hierarchical menu structure has unlimited levels from L0 to LN. However, as explained below, from L4 onwards (i.e. level L4-LN), each of the screens is essentially the same, being an exploration screen.

The direction of arrow D shown in FIG. 5 illustrates movement downwards through the hierarchical menu structure, or deeper into the hierarchical menu structure. Thus, moving in a direction D moves from one level in the menu structure (for example L2) to a lower level in the hierarchical menu structure (for example L3). Motion through the hierarchical menu structure in direction of arrow D could result from using the remote control handset 10 shown in FIGS. 1-4 by operating the first actuation element (or push button) 40 provided on the upper surface 20. A direction of arrow U shown in FIG. 5 represents movement through the hierarchical menu structure in an upwards direction. Thus, it could be considered to represent motion outwards in the menu structure. Navigation through the hierarchical menu structure in the direction of arrow U can result from using the remote control handset 10 shown in FIGS. 1-4 by operating the second actuation element 120 provided on the lower surface 80. Thus, for example, operation of actuation element 120 of remote control handset 10 could cause the menu structure to move from, for example, from level L3 to level L2.

As such, the push button 40 on the upper surface 20 may be referred to as an "in button", and the push-button 120 on the lower surface 80 may be referred to as an "out button".

The content being shown on the entertainment device can be from a variety of sources and/or be of a variety of media types. For example, the content accessible via the entertainment device could include: broadcast television programs; open internet protocol (IP) content; closed internet protocol (IP) content; internet content; picture content; and music content.

According to the schematic shown in FIG. 5, when a specific piece of content is being shown on an entertainment device in a full screen mode (for example a television program is being output by the entertainment device and watched by the user), the menu structure is in level L1: full screen content. Thus, in the menu structure shown in FIG. 5, the main content view mode is actually part of the hierarchical menu structure.

The home menu of the user interface for the entertainment device is level L2 in the schematic example shown in FIG. 5. Because, in this example, the full screen content, or view mode, is actually part of the hierarchical menu structure (as level L1), the home menu of level L2 can be accessed by operating the first push button 40 on the upper surface 20 of remote control handset 10 to go deeper into the menu structure.

In alternative embodiments, the full screen content mode may not actually be part of the hierarchical menu structure. In such alternative arrangements, the home menu of the hierarchical menu structure could be accessed by, for example, operating a different button on the remote control handset 10, by performing a particular motion on the touchpad 30, or by moving the handset in a particular manner (such as shaking the handset) and making use of a motion sensor in the remote control handset.

Once the home menu of level L2 of the hierarchical menu structure is accessed, a home menu screen is displayed. An example of such a home menu screen (level L2) is shown in FIG. 6.

Figure 6:
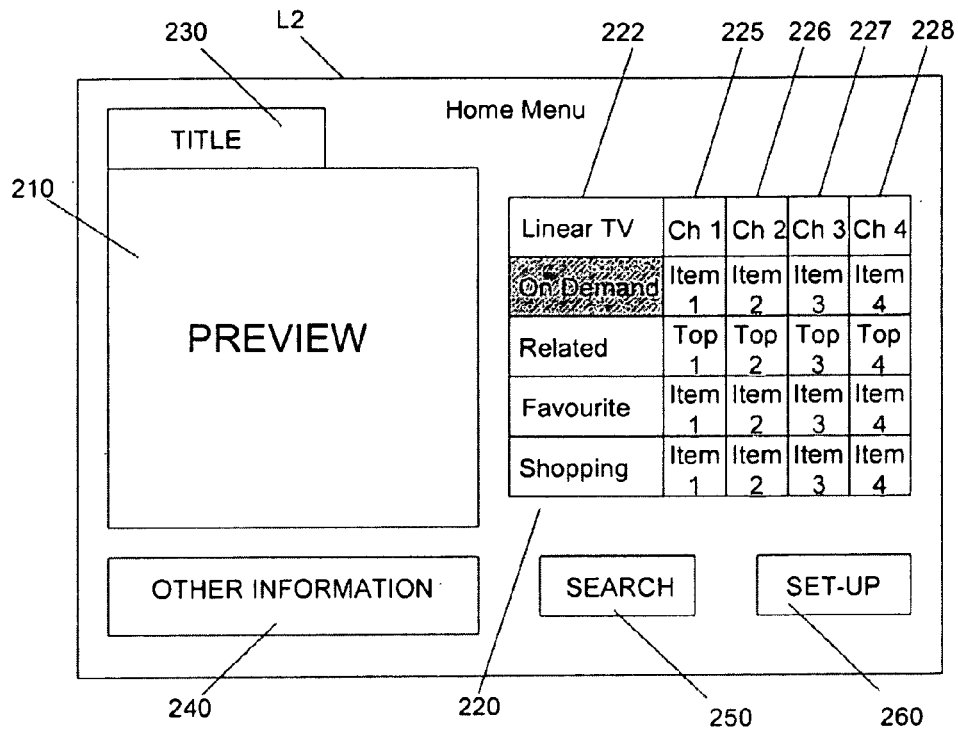
FIG. 6 illustrates an exemplary layout of a screen provided at a particular level of the hierarchical menu structure, the screen being referred to hereinafter as the "home menu", and the level being referred to as level L2.

The home menu screen shown in FIG. 6 has a number of different areas. Each area conveys different information, and some of the areas may be selectable. The layout of the menu screen shown in FIG. 6 is merely an example of an home menu screen that could be used in a graphical user interface to be controlled by remote control handset 10. Any other suitable menu screen could be used.

In the menu screen shown in FIG. 6, there is an area 220 which can be navigated using remote control handset 10 in order to highlight, and select, different pieces of content and/or different types and/or sources of content for viewing, display, or further investigation on an entertainment device.

The area 220 for navigation using remote control handset 10 comprises a grid of rows and columns. The first column 222 is a list of different types and/or sources of content. Examples of these different types and/or sources of content are shown in FIG. 6 and include: linear TV; On Demand TV (for example open IPTV and closed IPTV); related content; favorite content; and shopping content. In the row next to each of the content type/source options shown in column 222, there is a list of content for selection. In the example shown in FIG. 6, each list of content spans four columns 225, 226, 227 and 228. For example, the content in boxes Ch1-Ch4 next to the "Linear TV" option could show the content currently being broadcast on channels 1-4.

Similarly, four "On Demand" options could be shown in boxes Item 1-Item 4 next to the "On Demand" box in column 222. The choice of which four "On Demand" items should be displayed could be based on, for example, user preference for particular IPTV channels, or On Demand content related to the content that was previously being shown in level L1 before the home menu of level L2 was entered.

In boxes Top 1-Top 4 next to the "Related" option in column 222, the top four items of content available to the entertainment device that is most related to the content that was previously being displayed by the entertainment device (in level L1) could be shown. The content in boxes Top 1-Top 4 could be from any source.

Item 1-Item 4 next to the "Favorite" option of column 222 could show the top four favorite items as ranked by the user of the entertainment device.

Item 1-Item 4 in the row next to the "Shopping" entry of column 222 could show items for sale on shopping channels that, for example, are the most highly rated shopping channels according to the preferences of the user of the entertainment device.

According to the illustrated example, the entire grid 220 of the home menu can be navigated using remote control handset 10. As explained above, the remote control handset 10 can be aware of the current status of the entertainment device, and therefore know that the home menu (i.e. level L2) is currently being displayed. As such, the touch-sensitive input device 30 on the remote control handset 10 could have interface 35 shown in FIG. 4 displayed when the home menu is displayed on the entertainment device. Navigation left and right about the grid 220 would be possible using arrows 36, and navigation up and down through the grid 220 would be possible using arrows 37 of touchpad 30. In this way, any of the boxes in the grid 220 could be highlighted for selection and/or further investigation.

In the home menu shown in FIG. 6, the "On Demand" box is shown as being highlighted by the diagonal shading. Using the touchpad 30 of the remote control handset 10, any one of the items in the five columns 222, 225, 226, 227 and 228 could be highlighted.

In the event that a particular piece of content is highlighted (i.e, any one of the boxes in columns 225, 226, 227 and 228 is highlighted), a preview is shown in box 210 of the home menu. This could be, for example, a picture, a movie clip, or a currently broadcast program depending on the type and/or provider of the content.

Box 230 of the home menu would show the title of the content. Box 240 would show any other relevant information relating to the content. For example, such relevant information could be the price of purchasing the content (in the case of, for example, pay per view content), an advertisement relating to the content, and/or a description of the content.

According to the home menu shown in FIG. 6, it is also possible to highlight and select a search box 250 and a set-up box 260. The search box 250 would result in a search screen being displayed. The search screen would enable a user to input search criteria. The output of the search screen is very similar to level L4 of the menu structure, which is described below. Selection of the set-up box 260 would enable a user to adjust parameters of the entertainment device, such as colour parameters and/or sound parameters. For example, the user could adjust these parameters using the touch-sensitive input device 30 of the remote control handset 10.

Several options are available to a user once the required entry in grid 220 has been highlighted using the touch-sensitive input device 30.

If one of the source/content-type boxes of column 222 is highlighted, the user of the remote control handset 10 can press push button 40 on the upper surface 20 of the remote control handset 10 to select this option and move further down, i.e. deeper into the hierarchical menu structure. Depending on which of the options of column 222 is highlighted when the first push button 40 is depressed, a different level 3 screen would be displayed on the entertainment device. The screen would be in level 3 of the hierarchical menu structure, i.e one down from the home menu in level 2. Various level 3 screens are discussed below in relation to FIGS. 7-10. These are only examples of possible screens that are available in level 3, and others may be accessible. For example, it may also be possible to access screens relating to, for example, shopping and/or advertising in level L3.

If one of the items of content is highlighted, i.e. one of the items in column 225, 226, 227 and 228 is highlighted, then the user could select this for viewing on the entertainment device (i.e. select it for display in level L1 of the menu structure) by, for example, pressing play button 50 of remote control handset 10. Alternatively, it may be possible for the user to select the content for viewing by pressing the second push button 120 on the lower surface 80.

Alternatively, pressing the first push button 40 on the upper surface 20 on the remote control handset 10 when a piece of content in columns 225, 226, 227 and 228 is highlighted would again move deeper into the hierarchical menu structure. However, on this occasion, level L3 would be bypassed and the hierarchical menu structure would move straight into L4: exploration screen 1. This level 4 screen is explained below in relation to FIG. 11, after an explanation has been given to the various screens available in level L3.

Thus, in general, pressing the first push button 40 on the upper surface 20 on the remote control handset 10 when a piece of content is highlighted results in an exploration screen (Level L4 or lower) being displayed, whereas pressing the first push button 40 on the upper surface 20 on the remote control handset 10 when a source/content-type box in column 222 is highlighted results in a level L3 screen being displayed.

Figure 7:
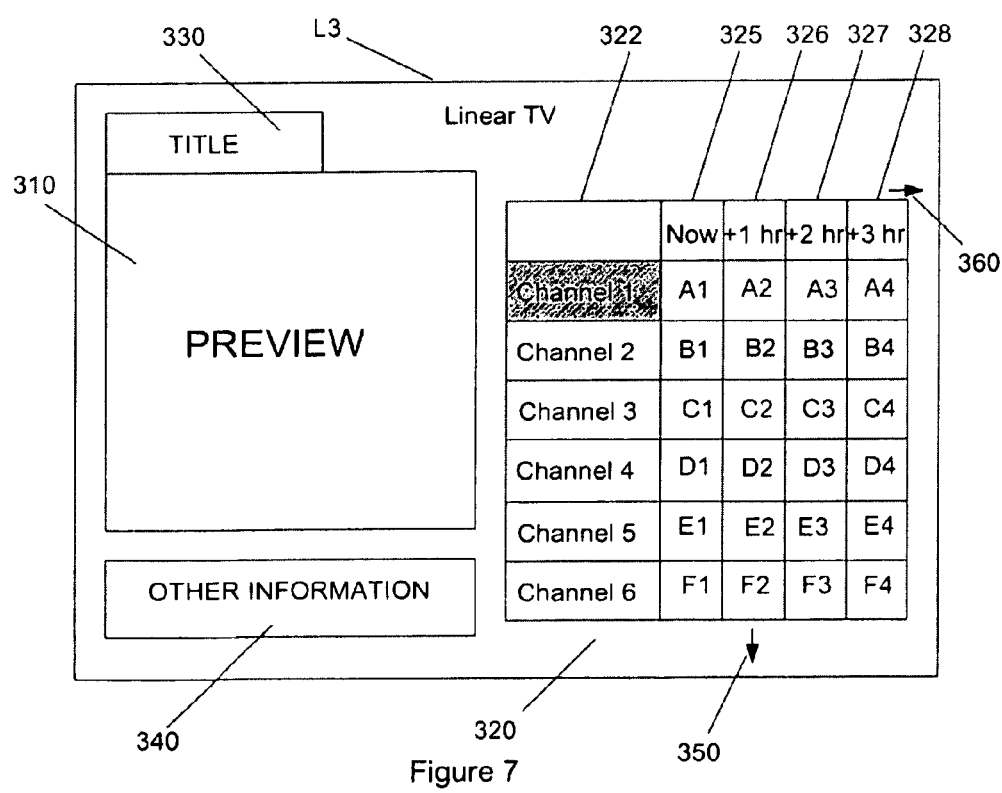
FIG. 7 illustrates an exemplary layout of a screen provided at a particular level of the hierarchical menu structure, the level being referred to hereinafter as level L3, or the "option screen" level, and the particular screen being referred to as the "Linear TV" screen.

If the "Linear TV" option of column 222 of the home menu of FIG. 6 is selected, a regular Electronic Program Guide (EPG) is displayed on the entertainment device. Such an Electronic Program Guide is shown in FIG. 7. The "preview", "title" and "other information" boxes of the "Linear TV" screen shown in FIG. 7 perform analogous functions to the equivalent boxes 210, 230 and 240 shown in FIG. 6, and will not be described further.

The Electronic Program Guide is shown in grid 320. Any suitable electronic program guide could be used.

Navigation around the electronic program guide 320 could be performed using touch-sensitive input device 30 of remote control handset 10. The navigation would be similar to the navigation around the grid 220 in the home menu of level L2, and will not be described further.

If a channel (in column 322) is highlighted for selection, then that channel could be viewed, for example by pressing play button 50 on remote control handset 10. Alternatively, the first push button 40 on the upper surface 20 could be used to move deeper into this branch of the hierarchical menu structure. For example, pressing first push button 40 could result in a more detailed electronic program guide relating to the highlighted channel being displayed.

Boxes A1-F4 in the electronic program guide grid 320 each represent different pieces of content. Content A1-F1 (content in the "Now" column 325 of electronic program guide grid 320) is available for selection for selection for viewing on the entertainment device. Again, this content could be selected by pressing the play button 50 of the remote control handset 10. Pressing the play button 50 when any of the other content (A2-F4) is highlighted could, for example, result in the piece of content being set to be recorded.

Alternatively, if the first push button 40 is depressed when any of the items of content in columns 325, 326, 327 and 328 (i.e items A1-F4) is highlighted, then this would result in moving deeper into the hierarchical menu structure, into level L4. Level L4 is explained below in relation to FIG. 11.

Pressing the second push button 120 would move higher up in the hierarchical menu structure, i.e. from level L3 back to the home menu of level L2 shown in FIG. 6. According to the example menu structure described, pressing second push button 120 when in any of the level L3 screens illustrated in FIGS. 7-10 would result in a return to the home menu of level L2 in FIG. 6.

The arrows 350 and 360 next to the grid 320 illustrate that the electronic program guide contains more information than that displayed in grid 320. As such, touch-sensitive input device 30 could be used to view programs to be broadcast further into the future by scrolling in the direction of arrow 360, and could also display more channels by scrolling in the direction of arrow 350. Each of the other level 3 screens shown in FIGS. 8-10 have analogous arrows for scrolling through more content.

Figure 8:
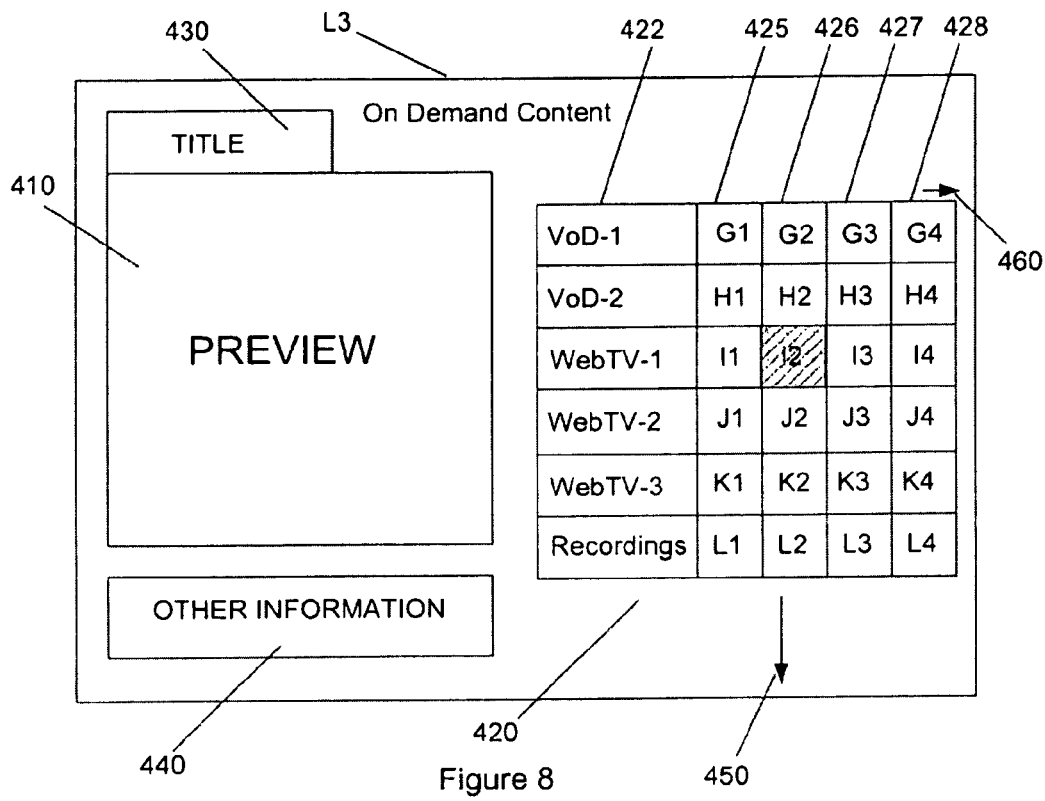
FIG. 8 illustrates an exemplary layout of another screen provided in level L3 of the hierarchical menu structure, the particular screen being referred to as the "On Demand Content" screen.

If the "On Demand" box of column 226 is highlighted when the first push button 40 is depressed, the hierarchical menu structure moves into the "On Demand Content" screen of level L3 shown in FIG. 8.

Again, the preview, title, and other information boxes, 410, 430 and 440 in FIG. 8 are analogous to the preview, title, and other information boxes 210, 230 and 240 of FIG. 6 and will not be described further.

Grid 420 of the On Demand Content screen can be navigated using the touch-sensitive input device 30, as described above in relation to the home menu screen of level L2 shown in FIG. 6.

The first column 422 of the grid 420 lists different sources of On Demand content, including open IPTV (such as web TV); closed IPTV (such as Video On Demand); and recorded items.

Any of the content items G1-L4 in the grid 420 can be highlighted using the touch-sensitive input device. The highlighted item can then be selected to be output by the entertainment device in full screen mode, for example using the play button 50 of the remote control handset 10.

If the first push button 40 on the upper surface 20 is depressed when a particular piece of content G1-L4 in columns 425, 426, 427 or 428 is highlighted, then the hierarchical menu structure moves down a level, so as to display exploration screen 1 of level L4. Level L4 is described in detail below in relation to FIG. 11.

If the first push button 40 on the upper surface 20 is depressed when one of the On Demand content sources shown in the first column 422 of grid 420 is highlighted, then the user interface would move deeper into the On Demand content branch of the menu structure. For example, this could lead to a more comprehensive list of the content available from a particular On Demand content source being displayed.

Figure 9:
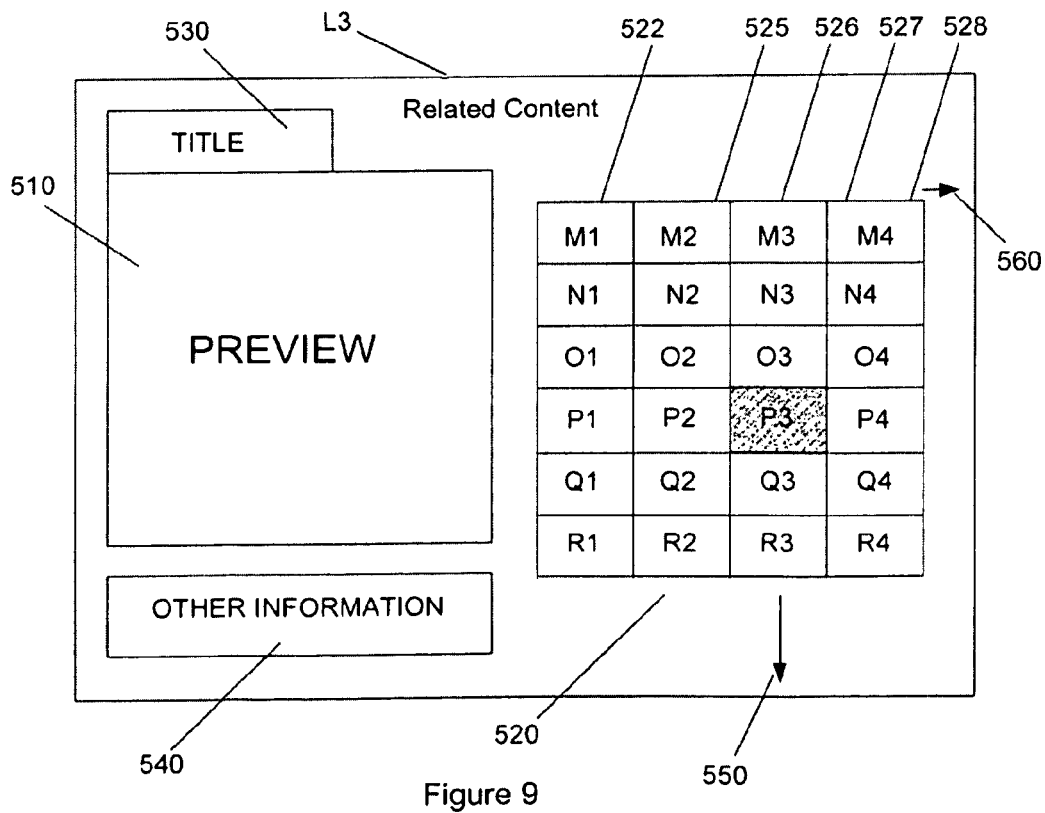
FIG. 9 illustrates an exemplary layout of another screen provided in level L3 of the hierarchical menu structure, the particular screen being referred to as the "Related Content" screen.

FIG. 9 shows another level L3 screen, this time showing "Related Content". This screen can be accessed by pressing the first push button 40 when the "Related" box of grid 220 in the home menu shown in FIG. 6 is highlighted.

Again, the preview, title, and other information boxes, 510, 530 and 540 in FIG. 9 are analogous to the preview, title, and other information boxes 210, 230 and 240 of FIG. 6 and will not be described further.

The "Related Content" screen shown in FIG. 9 has a grid 520. Grid 520 of the "Related Content" screen can be navigated using the touch-sensitive input device 30, as described above in relation to the home menu screen of level L2 shown in FIG. 6.

In the screen shown in FIG. 9, each of the items M1-R4 in the grid 520 represents a particular piece of content. Each of the pieces of content is related in some way to the content that was previously being shown by the entertainment device in level L1 when the hierarchical menu structure was entered. The content could be arranged in any appropriate manner. For example, the content in each row (or column) could be from a particular source, such as linear TV or On Demand content. Alternatively, the content in each row (or column) could relate to a different feature of the full screen content previously being shown in level L1.

Once highlighted, a particular piece of content could be accessed (i.e. shown as full screen content in level L1), for example by pressing play button 50 of remote control handset 10.

Alternatively, depressing first push button 40 on upper surface 20 of remote control handset 10 with a particular piece of content highlighted would move deeper into the hierarchical menu structure, to exploration screen 1 of level L4 which is described in more detail below in relation to FIG. 11.

As stated above, each piece of content in the grid 520 of the "Related Content" screen shown in FIG. 9 is related in some way to the content previously being displayed in level L1 of the entertainment device. For example, meta-data associated with the content being displayed in level L1 could be used to find other content which is related some way. For example, the relation could be that the content contains the same actor, relates to the same sports team, or is by the same composer. Any other suitable means for finding related content could be used.

Figure 10:
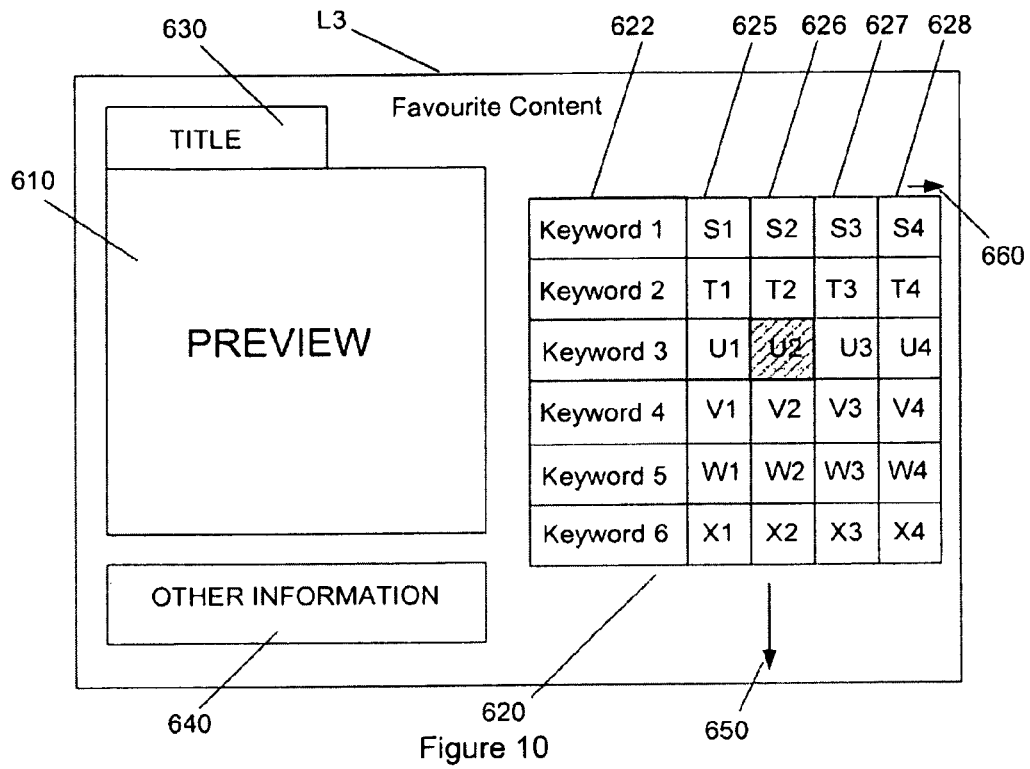
FIG. 10 illustrates an exemplary layout of another screen provided in level L3 of the hierarchical menu structure, the particular screen being referred to as the "Favourite Content" screen.

FIG. 10 shows a "Favorite Content" screen of level L3 that is displayed on the entertainment device when first push button 40 is depressed when the "Favorite" box in grid 220 of the home menu shown in FIG. 6 is highlighted.

Again, the preview, title, and other information boxes, 610, 630 and 640 in FIG. 10 are analogous to the preview, title, and other information boxes 210, 230 and 240 of FIG. 6 and will not be described further.

The "Favorite Content" screen shown in FIG. 10 has a grid 620. Grid 620 of the "Favorite Content" screen can be navigated using the touch-sensitive input device 30, as described above in relation to the home menu screen of level L2 shown in FIG. 6.

The grid 620 in the "Favorite Content" screen shown in FIG. 10 has a number of keywords in the first column 622, and various different pieces of content in column 625, 626, 627 and 628 in boxes S1-X4. The content in the row containing each keyword shows content that is presently available and that is related to the keyword shown in that row. The content can be from any available source, including linear TV, On-Demand content and/or the internet.

The keywords can be set by the user of the entertainment device using the remote control handset 10. For example, the user can set individual keywords in level 0 of the hierarchical menu structure, which is an information screen. This is described below in relation to FIG. 12.

Each box S1-X4 in the grid 620 can be highlighted by scrolling through the grid using the touch-sensitive input device 30 of remote control handset 10. As with the other screens in level L3, a particular piece of content, once highlighted, can be accessed or viewed, for example by pressing play button 50 on remote control handset 10.

Alternatively, pressing first push button 40 once a particular piece of content is highlighted moves deeper into the hierarchical menu structure to level L4. In level L4, an exploration screen 1 is displayed relating to the particular content that was highlighted when the first push button 40 was depressed.

Figure 11:
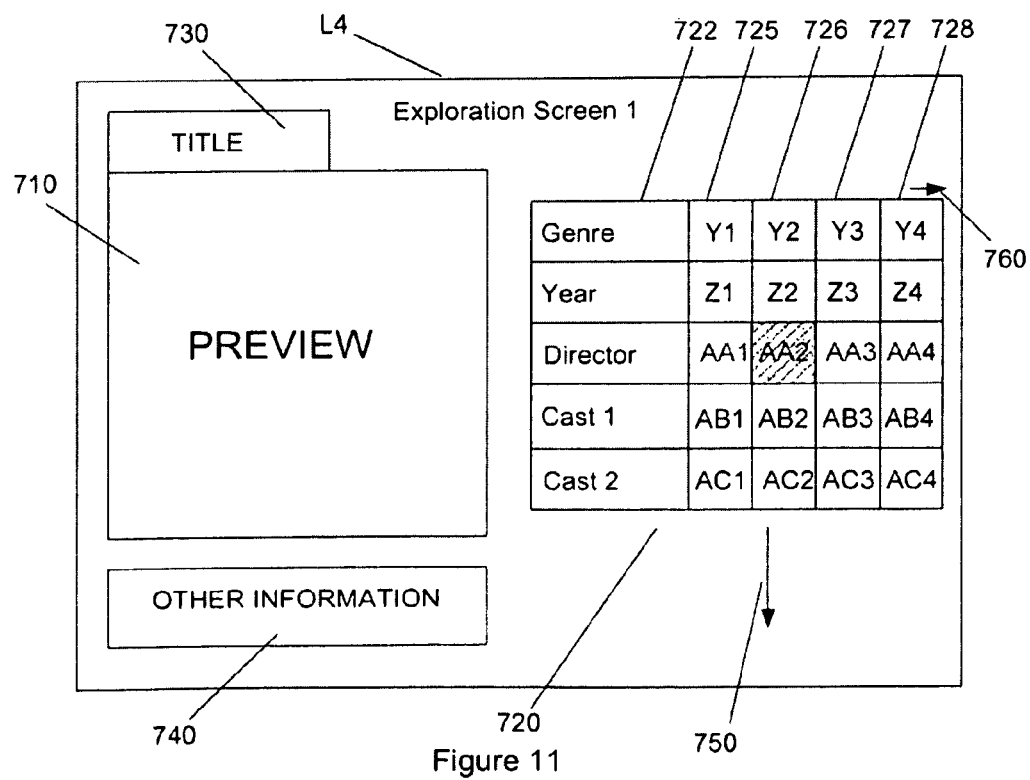
FIG. 11 illustrates an exemplary layout of a screen provided at a particular level of the hierarchical menu structure, the level being referred to hereinafter as level L4, or the "Exploration Screen 1" level.

FIG. 11 shows an example of an exploration screen in level L4 of the example hierarchical menu structure. As explained above, level L4 is also known as "Exploration Screen 1". It is accessed by operating first push button 40 when a particular piece of content in any one of the level 3 screens shown in FIGS. 7-10 or in the level 2 screen in FIG. 6 is highlighted.

Again, the preview, title, and other information boxes, 710, 730 and 740 in FIG. 11 are analogous to the preview, title, and other information boxes 210, 230 and 240 of FIG. 6 and will not be described further.

Exploration screen 1 contains a grid 720. The grid 720 has a first column 722 and lists various characteristics of the content that was highlighted in level 3 (or level 2) when the first push button 40 was depressed. The particular characteristics shown in the first column 722 could be obtained from, for example, meta-data associated with the content. The characteristics shown in column 722 of FIG. 11 would be typical of those that would be produced if the first push button 40 were depressed when a piece of content representing a movie was highlighted, but any other suitable characteristics could be displayed.

The other columns 725, 726, 727 and 728 in the grid 720 all contain individual pieces of content, which can be from any source. The content in each row is related to the characteristic in the first column of that row. Thus, for example, the content in each of boxes AA1-AA4 would have the same director as that of the piece of content in level L2 or L3 that was highlighted when first push button 40 was depressed.

Again, each piece of content Y1-AC4 can be highlighted by scrolling around the grid 720 using touch-sensitive input device 30 on remote control handset 10. Once highlighted, the content could be accessed for viewing on the entertainment device, for example by pressing play button 50 on remote control handset 10. The content shown in boxes Y1-AC4 could be from any source or be of any media type available to the entertainment device.

If the first push button 40 were depressed when a particular piece of content was highlighted, then the hierarchical menu structure would move down a level, to level L5. Level L5 is known as "Exploration Screen 2", and is essentially the same as exploration screen 1, except for the contents of the grid 720. Exploration screen 2 in level 5 would contain a different list of characteristics in column 722, these characteristics relating to the content that was highlighted in level L4 when push button 40 was depressed. Subsequent levels of the hierarchical menu structure L6-LN could be similarly accessed by pressing first push button 40 when a particular piece of content was highlighted.

Returning to "Exploration Screen 1" of level L4 shown in FIG. 11, if the second push button 120 on the lower surface 80 of the remote control handset were depressed at any point, the hierarchical menu structure would be instructed to move up a level. As such, the hierarchical menu structure would move back to level L2 or L3, depending on which screen was being displayed before exploration screen 1 of level L4 was accessed.

Figure 12:
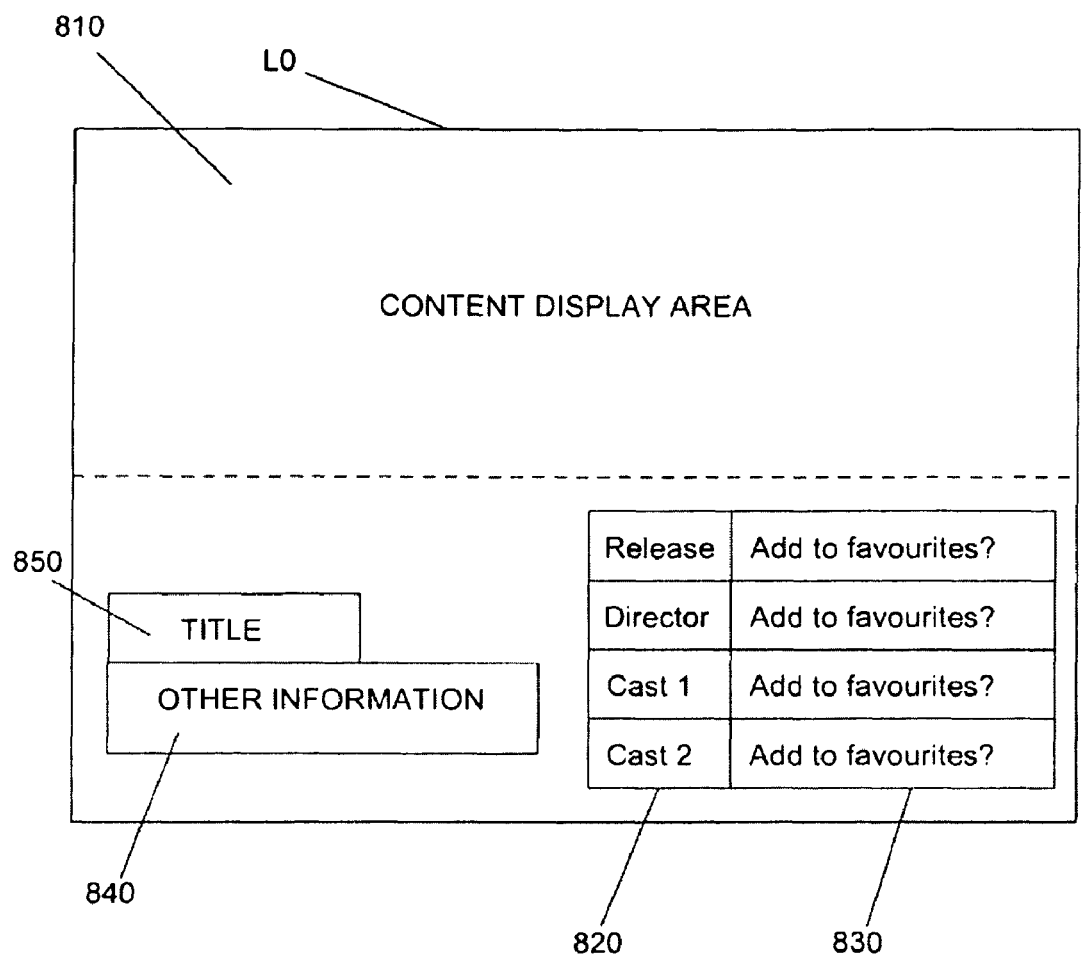
FIG. 12 illustrates an exemplary layout of a screen provided at a particular level of the hierarchical menu structure, the level being referred to hereinafter as level L0, or the "Information Screen" level.

FIG. 12 shows a typical "Information Screen" of level L0 of the hierarchical menu structure. This could be accessed from the full screen content (i.e. level L1) by pressing the first push button (or "out button") 120 on remote control handset 10. The "Information Screen" in level L0 has a first area 810 in which the content that was being shown in level L1 is displayed. It also has an area 840 relating to information about the content being displayed, and an area 850 showing the title of the content being displayed.

List 820 of the "Information Screen" shown in FIG. 12 lists various features of the content. These could be obtained, for example, using meta-data relating to the content. Column 830, which is next to list 820 in the information screen, allows the characteristics of the content to be set as favorites. The favorites could then be, for example, added as key words in the "Favorite Content" screen of level L3 shown in FIG. 10.

The row of column 830 that is highlighted could be changed using touch-sensitive input device 30 of remote control handset 10. A particular characteristic could then be added to favorites by, for example, pressing one of the buttons on remote control handset 10.

Once the user has finished using the "Information Screen" of level L0, they could return to the full screen content of level L1 by pressing the first push button (or "in button") 40 of remote control handset 10.

The navigation of a typical hierarchical menu structure using a remote control handset 10 according to the invention has been described above. The remote control handset 10 may also have other features that assist in making the navigation of the hierarchical menu structure more intuitive.

For example, when the hierarchical menu structure is in level L0, there is no higher level available. Thus, the second actuation element 120 on the lower surface 80 of the remote control handset 10 serves no function. Thus, in one embodiment, it may not be possible to operate the second actuation element when the menu structure is in level L0. This could be achieved by, for example, locking a push button 120 in position so that is cannot be depressed, or by recessing the push button 120 back into the body of the remote control handset 10.

One or more of: the first actuation element 40; the second actuation element 120; and the touch-sensitive input device 30 could be provided with tactile, or haptic, feedback. This would enable information about the entertainment device, or the user interface of the entertainment device to be conveyed directly to the user. For example, a particular tactile output could be provided to the touchpad 30 if a user is trying to scroll upwards in a grid even though the highlighted grid element is already at the top of the grid.

Although the remote control handset 10 has been described in relation to the schematic hierarchical menu structure shown in FIG. 5, it will be appreciated that the remote control handset 10 could be used to provide signals to control the functions of any suitable entertainment device and/or user interface having a hierarchical menu structure.

I claim:

1. A remote control handset for navigating a user interface of an entertainment device, the user interface having a hierarchical menu structure with at least two levels, said remote control handset including:
    a body having an upper surface and a lower surface, the lower surface being substantially opposite to the upper surface;
    a first actuation element provided on the upper surface of said body; and
    a second actuation element provided on the lower surface of said body, wherein
    said first actuation element is configured to provide a signal for navigation through levels of the hierarchical menu structure in a first direction; and
    said second actuation element is configured to provide a signal for navigation through levels of the hierarchical menu structure in a second direction that is opposite to said first direction, wherein
    both of said first actuation element and said second actuation element are push buttons,
    said first actuation element is configured to be depressed in a direction that defines the positive direction of a first axis, and
    said second actuation element is configured to be depressed in a direction that has a component in the negative direction along said first axis.

2. The remote control handset according to claim 1, wherein:
    said second actuation element is configured to be depressed in a direction that has a component in a second axis that is orthogonal to said first axis, and has no component in a third axis that is orthogonal to said first axis and said second axis, and wherein
    said second axis points substantially along a longitudinal direction of said body of said remote control handset.

3. A remote control handset for navigating a user interface of an entertainment device, the user interface having a hierarchical menu structure with at least two levels, said remote control handset including:
    a body having an upper surface and a lower surface, the lower surface being substantially opposite to the upper surface;
    a first actuation element provided on the upper surface of said body; and
    a second actuation element provided on the lower surface of said body, wherein
    said first actuation element is configured to provide a signal for navigation through levels of the hierarchical menu structure in a first direction; and
    said second actuation element is configured to provide a signal for navigation through levels of the hierarchical menu structure in a second direction that is opposite to said first direction, wherein
    said first actuation element is provided on a first surface having a normal that defines the positive direction of a first axis,
    said second actuation element is provided on a second surface having a normal that has a component in the negative direction of said first axis, and
    at least one of said first actuation element and said second actuation element is a touch-sensitive input device.

4. The remote control handset according to claim 3, wherein:
    the normal of said second surface is in a direction that has a component in a second axis that is orthogonal to said first axis, and has no component in a third axis that is orthogonal to said first axis and said second axis, and wherein
    said second axis points substantially along a longitudinal direction of said body of said remote control handset.

5. The remote control handset according to claim 2, wherein:
    said third axis points substantially along a width direction of said body of said remote control handset; and
    the dimension of said remote control handset in said longitudinal direction is greater than the dimension of said remote control handset in said width direction.

6. The remote control handset according to claim 4, wherein:
    said third axis points substantially along a width direction of said body of said remote control handset; and
    the dimension of said remote control handset in said longitudinal direction is greater than the dimension of said remote control handset in said width direction.

7. The remote control handset according to claim 1, wherein:
    said remote control handset further includes a touchpad configured to interact with said entertainment device; and
    said first actuation element is a part of said touchpad.

8. The remote control handset according to claim 7, wherein said touchpad is configured to provide a signal for navigation within the levels of the hierarchical menu structure of said user interface.

9. The remote control handset according to claim 7, wherein said touchpad is configured to provide a signal for controlling parameters of the entertainment device, said parameters including at least one of: sound parameters; picture colour parameters; and channel number.

10. The remote control handset according to claim 7, wherein the function of the touchpad can change in response to the state of the entertainment device.

11. The remote control handset according to claim 10, wherein:
    the touchpad is provided with a display associated with its function at any given time; and
    said display on said touchpad can change in response to a change in function of the touchpad.

12. The remote control handset according to claim 10, wherein the remote control handset is configured to interact with said entertainment device so as to identify the state of the entertainment device.

13. The remote control handset according to claim 12, wherein the remote control handset is configured to interact with said entertainment device using Bluetooth™ technology.

14. The remote control handset according to claim 1, wherein said second actuation element is configured only to be operated when the hierarchical menu structure of the user interface is in a level in which operation of said second actuation element would cause a change in the level.

15. A remote control handset for navigating a user interface of an entertainment device, the user interface having a hierarchical menu structure with at least two levels, said remote control handset including:
    a body having an upper surface and a lower surface, the lower surface being substantially opposite to the upper surface;
    a first actuation element provided on the upper surface of said body; and
    a second actuation element provided on the lower surface of said body, wherein said first actuation element is configured to provide a signal for navigation through levels of the hierarchical menu structure in a first direction; and said second actuation element is configured to provide a signal for navigation through levels of the hierarchical menu structure in a second direction that is opposite to said first direction, wherein one or more of: said first actuation element; said second actuation element; and said touchpad is/are configured to provide a tactile output in response to one or more of: the state of said entertainment device; the state of the user interface; and an input from the remote control handset.

16. The remote control handset according to claim 1, further comprising another actuation element configured to allow selection of content in said user interface.

17. The remote control handset according to claim 1, wherein:

the first direction, in which said first actuation element is configured to provide signals for navigation through the hierarchical menu structure, moves deeper into the hierarchical menu structure; and the second direction, in which said second actuation element is configured to provide signals for navigation through the hierarchical menu structure, moves upwards in the hierarchical menu structure.

18. The remote control handset according to claim 1, wherein the remote control handset is configured to control a television set via a graphical user interface.

19. A control apparatus for an entertainment device including:

a remote control handset according to claim 1; and a user interface for an entertainment device, the user interface having a hierarchical menu structure with at least two levels, wherein the remote control handset is configured to provide signals for navigating the user interface.

20. An entertainment system including:

the control apparatus of claim 19; and an entertainment device, wherein the control apparatus is configured to provide signals for controlling the entertainment device.

21. A method of navigating a user interface for an entertainment device using a remote control handset, the user interface having a hierarchical menu structure, the method including:

providing a remote control handset having: a body with an upper surface and a lower surface, the lower surface being substantially opposite to the upper surface; a first actuation element; and a second actuation element;

arranging the first actuation element on the upper surface of said body;

arranging the second actuation element on the lower surface of said body;

navigating through the hierarchical menu structure in a first direction using said first actuation element; and navigating through the hierarchical menu structure in a second direction that is opposite to said first direction using said second actuation element, wherein both of said first actuation element and said second actuation element are push buttons, said first actuation element is configured to be depressed in a direction that defines the positive direction of a first axis, and said second actuation element is configured to be depressed in a direction that has a component in the negative direction along said first axis.

* * * * *